United States Patent [19]

Rockel

[11] Patent Number: 5,142,275
[45] Date of Patent: Aug. 25, 1992

[54] METHOD AND MEANS FOR MANIPULATING IMAGES IN A VIDEO DISPLAY

[75] Inventor: Jeffrey D. Rockel, West Allis, Wis.

[73] Assignee: General Electric Company, Milwaukee, Wis.

[21] Appl. No.: 679,642

[22] Filed: Dec. 10, 1984

[51] Int. Cl.⁵ .................................................. G09G 1/0
[52] U.S. Cl. ................................... 340/709; 340/799
[58] Field of Search ................ 364/414; 358/111, 182, 358/183, 22; 378/99, 901; 340/721, 747, 724, 723, 726, 709, 799

[56] References Cited

U.S. PATENT DOCUMENTS

| | | | |
|---|---|---|---|
| 4,497,024 | 1/1985 | Roth | 340/723 |
| 4,550,386 | 10/1985 | Hirosawa et al. | |
| 4,710,762 | 12/1987 | Yamada | 340/799 |

FOREIGN PATENT DOCUMENTS

| | | |
|---|---|---|
| 0108520 | 5/1984 | European Pat. Off. . |
| 0120683 | 10/1984 | European Pat. Off. . |
| 0156116 | 10/1985 | European Pat. Off. . |

OTHER PUBLICATIONS

Daniels "The architecture of the Lisa TM personal Computer" Proceedings of the IEEE, New York, pp. 331-341, vol. 72, No. 3, Mar. 3, 1984.
Williams, G. "The Lisa Computer System," *Byte*, Feb. 1983, pp. 33-50.

*Primary Examiner*—Alvin E. Oberley
*Attorney, Agent, or Firm*—Henry K. Woodward

[57] ABSTRACT

Control of a split screen display and the display of sequential images on a display is effected by rotation of a trackball. Pulse trains generated by rotation of the trackball are inputted to a microprocessor which controls the junctions in a split screen and the image data applied to a display.

5 Claims, 6 Drawing Sheets

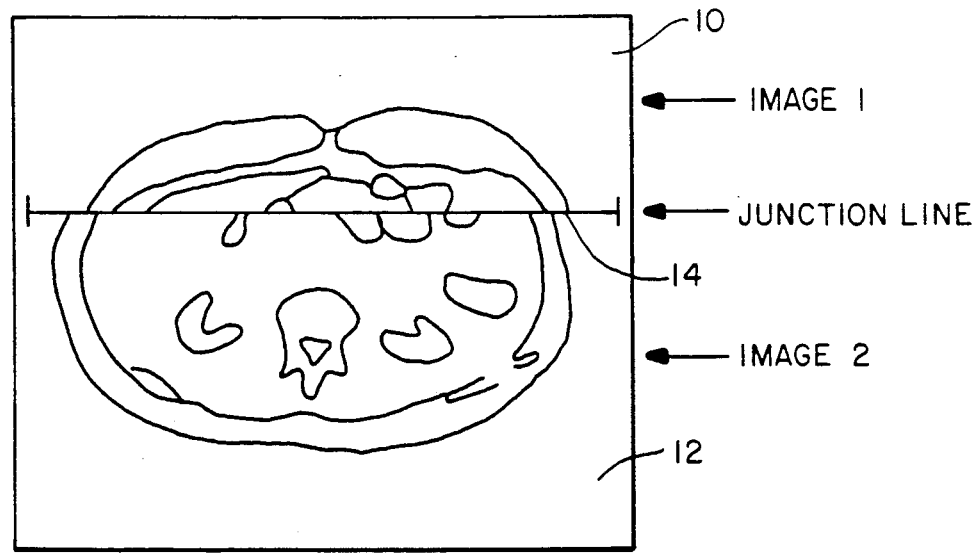
FIG. — 1A
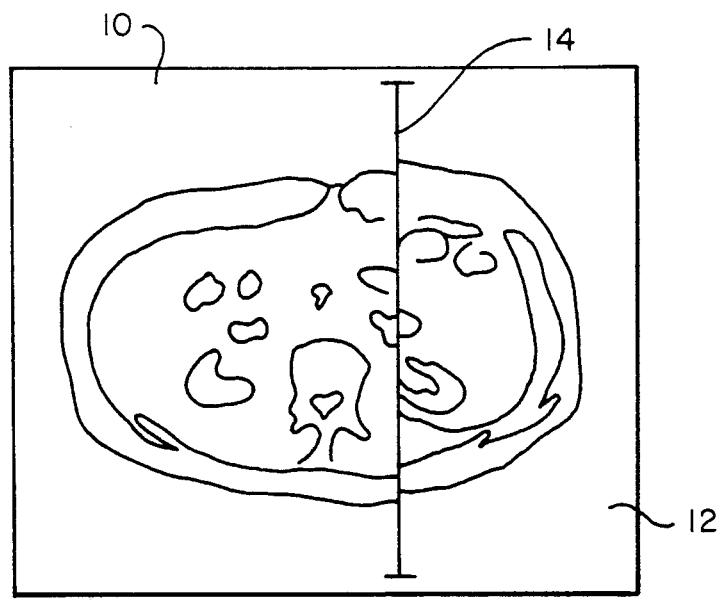
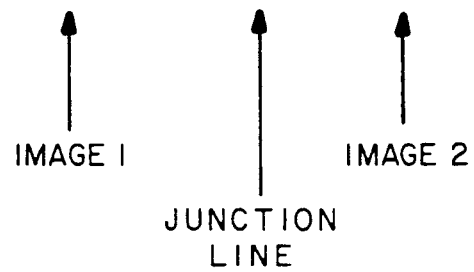
FIG. — 1B

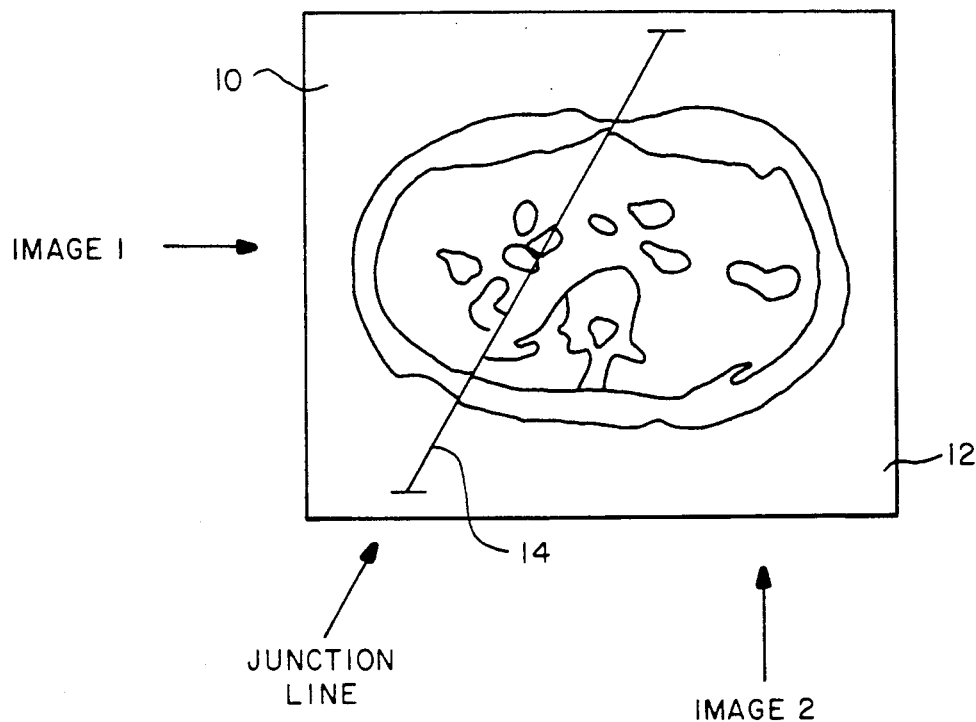
FIG.—1C
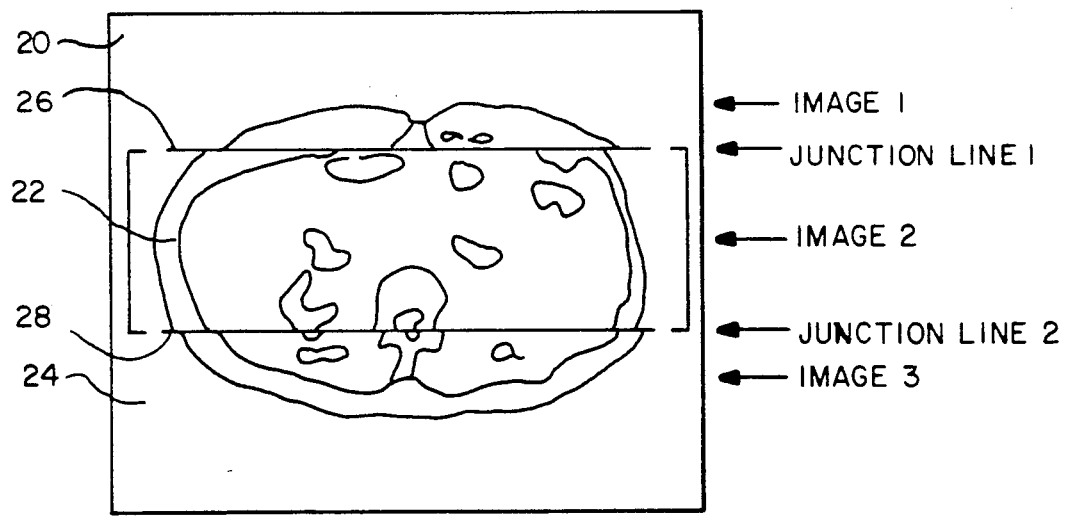
FIG.—1D

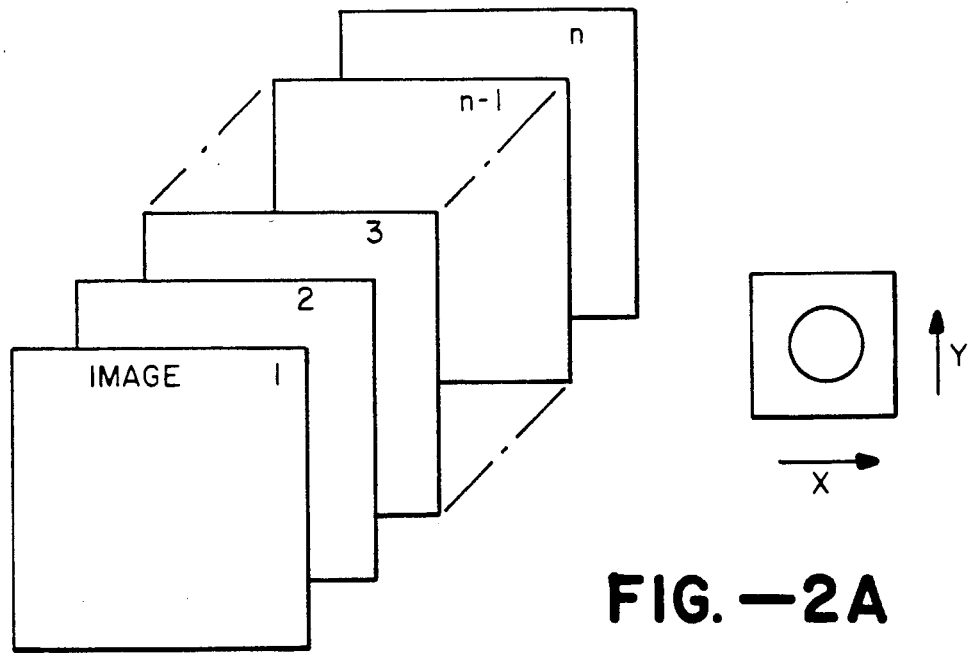
FIG.—2A
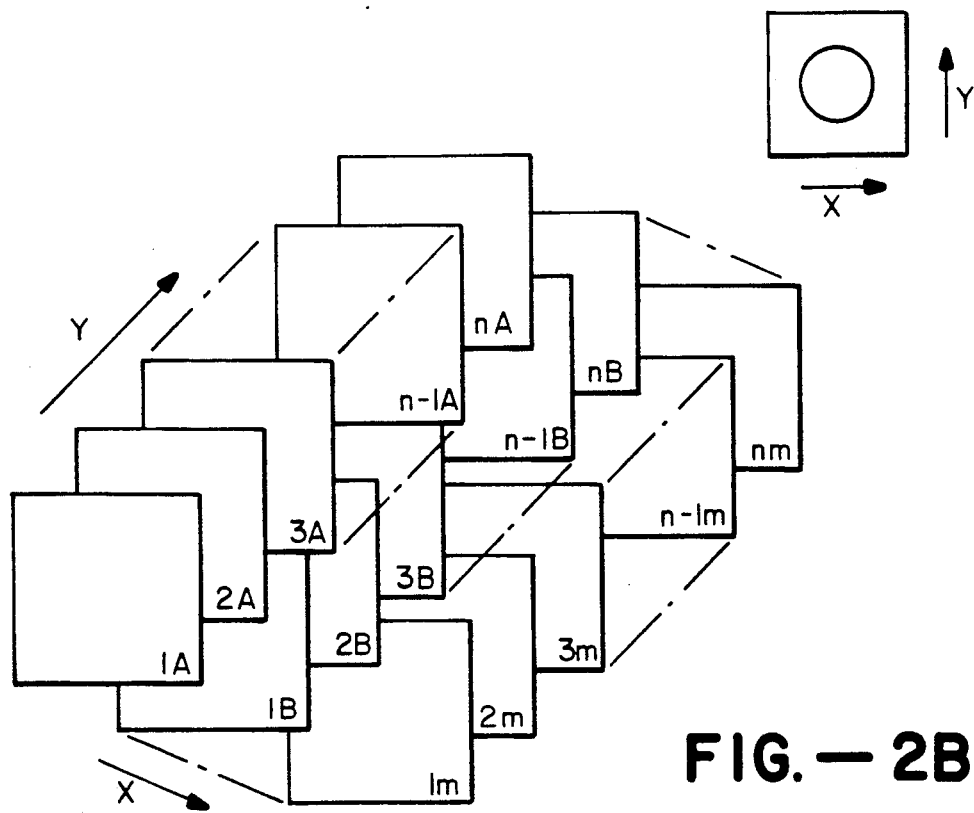
FIG.—2B

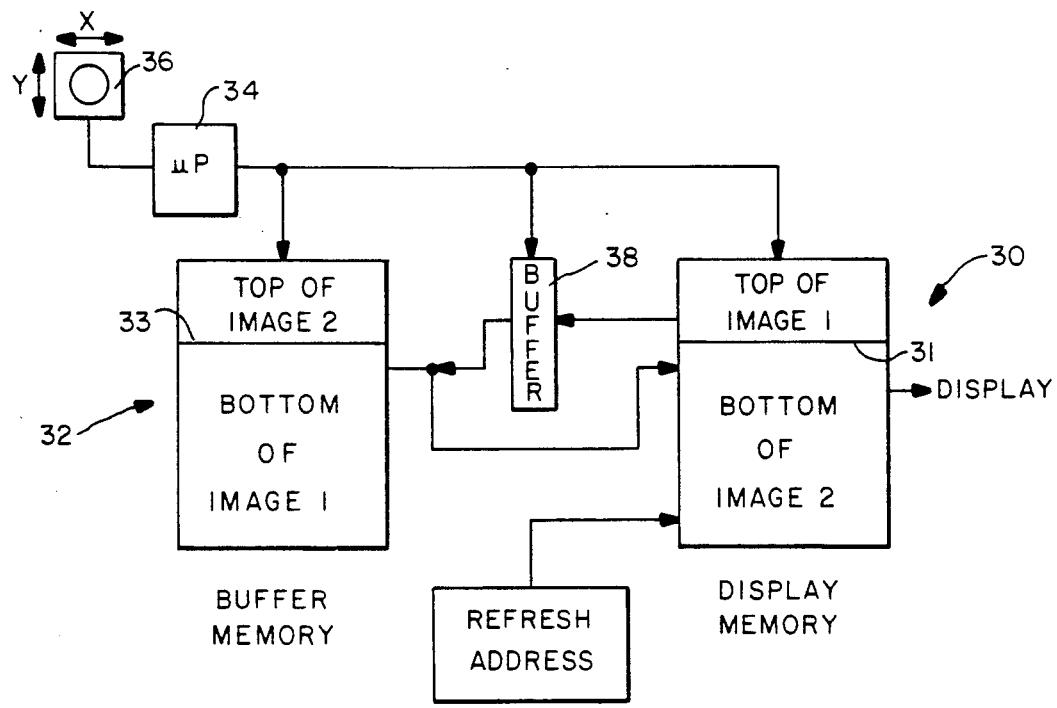
FIG.—3
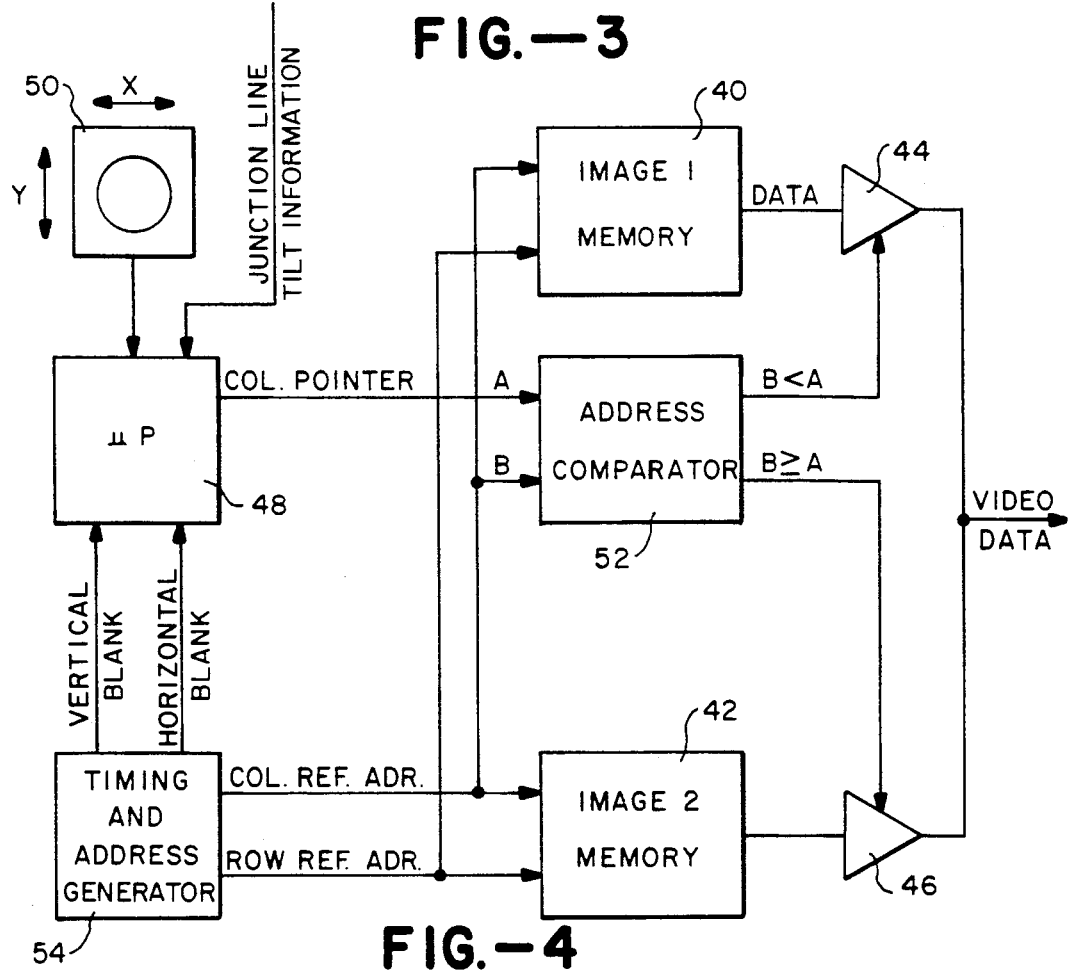
FIG.—4

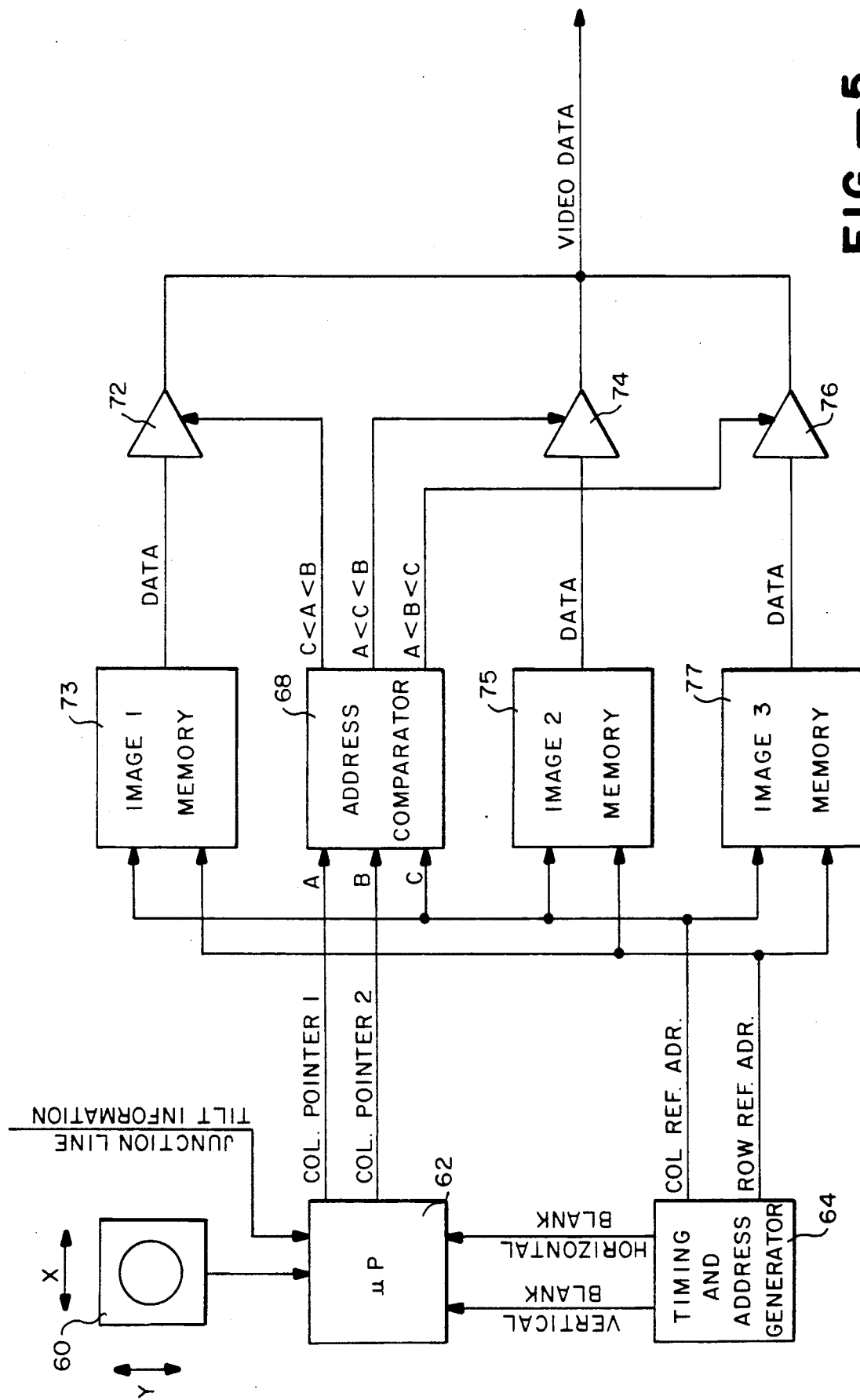
FIG.—5

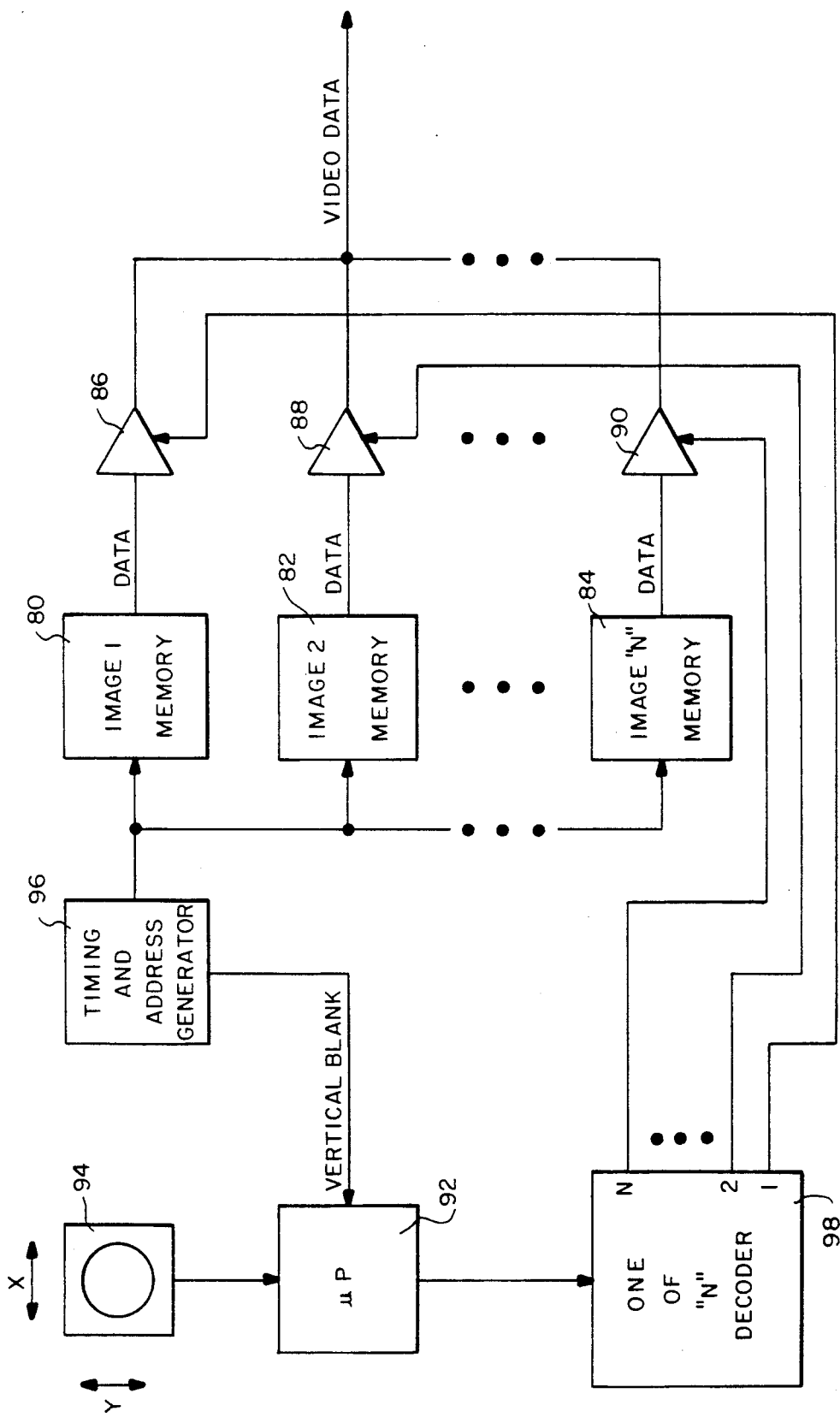
FIG.—6

METHOD AND MEANS FOR MANIPULATING IMAGES IN A VIDEO DISPLAY

This invention relates generally to video display systems, and more particularly the invention relates to manipulating images in a video display.

In medical diagnostic apparatus such as X-ray and NMR tomographic scanning systems a plurality of cross sectional images of a patient can be reconstructed representing adjacent slices through a patient or representing one or more slices through the patient at different time periods. It is often desirable and useful to simultaneously view portions of several images to facilitate diagnosis. Further, it would be useful to vary the displayed portions of each image. Heretofore, control of displayed images has been complicated by the necessary use of a keyboard for controlling a computer or other device in the image display system.

The present invention is directed to improved apparatus for manually controlling a video display so that a plurality of images can be selectively and rapidly displayed in series and portions of a plurality of images can be viewed simultaneously on one video display with the displayed portions being readily controlled manually.

In accordance with one feature of the invention a trackball is employed to vary the junction line between two or more images being displayed. For example, rotation of the trackball along either the X or Y axis can establish the junction between two images.

As is well known, a trackball is the equivalent of an electronic joystick and comprises a smooth ball which is supported for revolving in all directions in a socket in a control console. A hemisphere of the ball is exposed so that an operator can rotate the ball by finger touch while watching a response on the display screen The concealed hemisphere of the ball rests on at least a pair of rollers which drive encoders. The encoders produce trains of electric impulses when the ball is turned.

In accordance with another feature of the invention a plurality of memories are employed to store data for a plurality of images. The trackball can be employed to adjust the addressing of the memories for displaying portions of a plurality of images from selected data stored in the memories or for sequentially displaying complete images.

The invention and objects and features thereof will be more readily apparent on the following detailed description and appended claims when taken with the drawings, in which:

FIGS. 1A-1D are schematic representations of split screen video imaging in accordance with the present invention.

FIGS. 2A and 2B are schematic illustrations of series imaging in accordance with the present invention.

FIG. 3 is a functional block diagram of split image control apparatus in accordance with one embodiment of the invention.

FIG. 4 is a functional block diagram of split image control apparatus in accordance with another embodiment of the invention.

FIG. 5 is a functional block diagram of a triview image control apparatus in accordance with one embodiment of the invention.

FIG. 6 is a functional block diagram of series image control apparatus in accordance with another embodiment of the invention.

Referring now to the drawings, FIGS. 1A through 1D illustrate split screen images in accordance with one embodiment of the invention. In FIG. 1A, for example, the top portion of a first image 10 is simultaneously displayed along with the bottom portion of a second image 12 with a junction line 14 there between. The simultaneous imaging of portions of both images can be important in medical diagnosis for illustrating changes in texture over a period of time, for example. Importantly, in accordance with the invention the junction line 14 can be moved to illustrate greater or lesser portions of the two images 10 and 12. The two images may be separated by distance (e.g. two consecutive slices) or by time (e.g. tumor growth).

The junction line can be rotated and the images manipulated along any axis as illustrated in FIGS. 1B and 1C. Thus, comparisons along any axis are practical.

Further, as illustrated in FIG. 1D portions of three images 20, 22, and 24 separated by the junction lines 26 and 28 can be displayed. Control of the two junction lines 26, 28 in accordance with one embodiment of the invention is effected by the rotation of a trackball along the X and Y axes, respectively.

FIGS. 2A and 2B illustrate applications of the invention in accordance with another embodiment. In these applications a series of images can be displayed sequentially for viewing adjacent cross sections of a patient or for viewing a fixed cross section over a period of time. FIG. 2B illustrates a combination in which the images 1A through nA are adjacent cross sectional images while the images 1M through nM are corresponding cross sections at a different period of time. Control of the adjacent images can be effected by movement of a trackball along the Y axis, while movement of the images with time can be effected by movement of the trackball along the X axis as shown.

In accordance with the invention the control of the split images or sequential images is readily effected by a trackball control of a microprocessor. FIG. 3 is a functional block diagram of apparatus for controlling a split screen display. In this embodiment portions of two images are maintained in the display memory 30 and a buffer memory 32. The junction lines 31 and 33 in the two memories are controlled by microprocessor 34 in response to the movement of trackball 36. For example, as the trackball is moved vertically the junction lines 31 and 33 are adjusted whereby image line data for the image 1 is increased or decreased in the display memory 30 while image line data for image 2 is decreased and increased, respectively, in the display memory. For example, when image 2 is increased in the display memory, line data for image 1 in the display memory is loaded into a buffer 38. Line data for image 2 is then loaded into the display memory 30, and thereafter the data in buffer 38 is transferred to buffer memory 32.

FIG. 4 illustrates another embodiment of the invention for controlling a split screen display. In this embodiment first and second image memories 40 and 42, respectively, contain the line data for two images. Data from the two memories are provided through drivers 44 and 46 as video data. Control of the outputs of drivers 44 and 46 is maintained by microprocessor 48 in response to the movement of trackball 50 along either the X or Y axis. The microprocessor calculates the column position of the junction line for each row of image data. This position is determined by movement of the trackball, tilt of the junction line, and row number (which can be determined by counting horizontal blank pulses after the vertical blank pulse from timing and address generator 54). During the horizontal blank prior to the next row to be displayed, the controller loads the next column address into the "A" input of comparator 52. Column refresh addresses are applied to the "B" input. While the column refresh address is less than the column pointer address, data from Image 1 memory are enabled to the output video data stream by buffer 46. Once the column refresh address equals the column pointer address and for all subsequent addresses until the next horizontal blank, data from Image 2 memory are enabled to the output video data stream by buffer 44.

FIG. 5 is a functional block diagram of an embodiment of the invention for triview as illustrated of FIG. 1D. In this embodiment, rotation of the trackball 60 along the Y axis controls the junction line 26 in FIG. 1D, and rotation of the trackball 60 along the X axis controls the junction line 28. First, second and third image memories 73, 75 and 77, respectively, contain the line data for three images. Data from the three memories are provided through drivers 72, 74 and 76 as video data. Control of the outputs of drivers 72, 74 and 76 is maintained by microprocessor 62 in response to the movement of trackball 60 in either the X or Y axis. The microprocessor calculates the column positions of the junction lines for each row of image data. These positions are determined by movement of the trackball, tilt of the junction lines, and row number. During the horizontal blank prior to the next row to be displayed the controller loads the next column addresses into the "A" and "B" inputs of comparator 68. Column refresh addresses from timing and address generator 64 are applied to the "C" input. While the column refresh address is less than both of the column pointer addresses, data from Image 1 memory are enabled to the output video data stream by buffer 72. When the column refresh address equals the "A" column pointer (assume "A" is numerically less than "B") and for all subsequent addresses until the column refresh address equals the "B" column pointer, data from Image 2 memory are enabled to the output video data stream by buffer 74. When the column refresh address equals the "B" column pointer and for all subsequent addresses until the next horizontal blank, data from Image 3 memory are enabled to the output video data stream by buffer 76.

FIG. 6 is a functional block diagram of an embodiment of the invention in which images can be sequentially displayed. In this embodiment first, second and up through the "N"th image memories 80, 82 and up through 84, respectively, contain the line data for "N" images. Data from the "N" memories are provided through drivers 86, 88 and up through 90 as video data. Control of drivers 86, 88 and up through 90 is maintained by the microprocessor 92 in response to the movement of trackball 94 along either the X or Y axis. In the sequential image mode, one of the drivers 86, 88 or up through 90) will be activated for the entire image data transfer. As the trackball is moved, the microprocessor determines which image to display next. During the next vertical blank from timing and address generator 96, the microprocessor selects a new image memory by writing to the One-of-"N" decoder 98.

Use of a trackball for controlling split screen and sequential image display is particularly advantageous in scanner systems for medical applications since image control is readily effected while the operator is viewing the video screen. While the invention has been described with reference to several embodiments, the description is illustrative of the invention and is not to be construed as limiting the invention. Various modifications and applications may occur to those skilled in the art without departing from the true spirit and scope of the invention as defined by the appended claims.

What is claimed:

1. In scanning apparatus in which cross-sectional images are generated by tomographic reconstruction techniques, apparatus for selectively controlling the simultaneous display of portions of a plurality of images comprising:

memory means for storing addressable data for a plurality of images, a trackball for generating at least a first pulse train in response to rotation of said trackball, and microprocessor means connected to said trackball and to said memory means and responsive to said pulse train for selecting data from portions of at least two images for simultaneously viewing on a display screen, said microprocessor means responding to rotation of said trackball for establishing a junction line between the displayed portions of at least two images and the proportions of said displayed portions.

2. Apparatus as defined by claim 1 wherein portions of at least three images are displayed simultaneously, rotation of said trackball generates a second pulse train, said microprocessor means being response ti said first and second pulse trains for establishing junction lines between the displayed portions of said first and second images and between the displayed portions of said second and third images.

3. Apparatus as defined by claim 2 wherein said memory means comprises three buffer memories and three drivers connected respectively to said three buffer memories, said microprocessor means including first and second counters for counting to first and second boundary lines, comparator means for comparing counts from said first and second counters with count from an address counter, said comparator means controlling said three drivers in response to comparing said counts.

4. Apparatus as defined by claim 1 wherein said memory means includes first and second memories for storing first and second images, respectively, said first memory storing data for a top portion of a first image and a bottom of a second image, said second memory storing data for the top portion of said second image and the bottom portion of said first image, said microprocessor means including buffer means for transferring data between said first and second memories in response to said at least first pulse train.

5. Apparatus as defined by claim 1 wherein said memory means includes first and second memories for respectively storing first and second images, first and second drivers connected to said first and second memories, respectively, said microprocessor means including comparator means for comparing a refresh address with a boundary count for selectively activating said first and second drivers.

* * * * *